Nov. 10, 1942.  R. F. PEO  2,301,318
THERMOSTATIC BYPASS VALVE
Filed Sept. 5, 1941  2 Sheets-Sheet 1
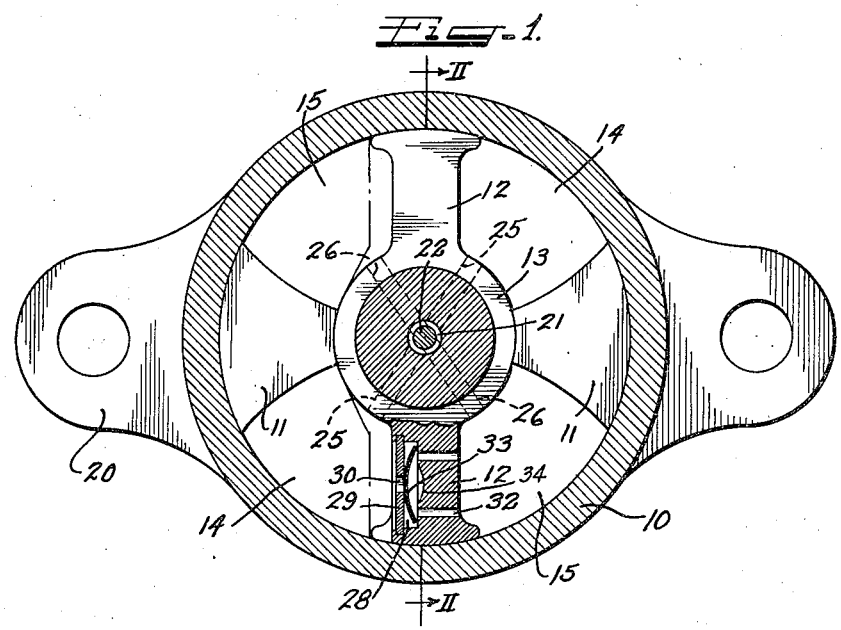
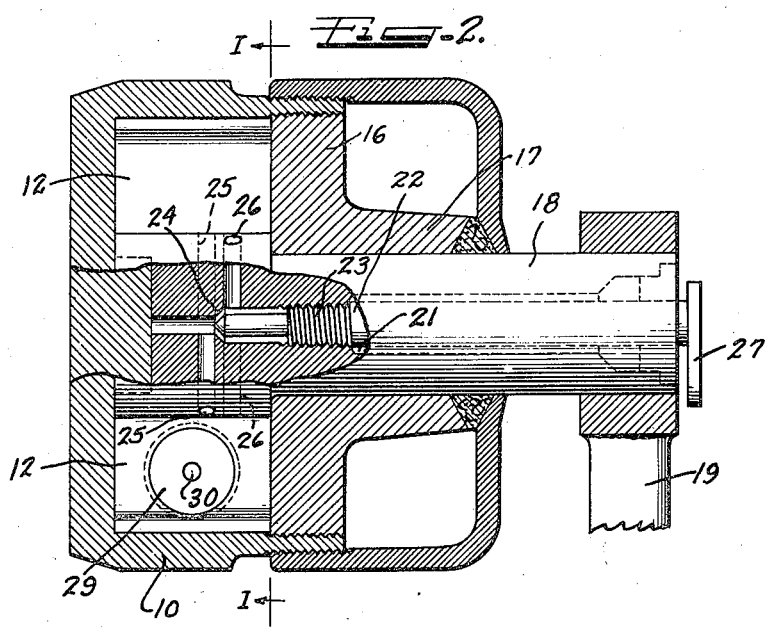
Inventor
RALPH F. PEO.

Nov. 10, 1942.  R. F. PEO  2,301,318
THERMOSTATIC BYPASS VALVE
Filed Sept. 5, 1941  2 Sheets-Sheet 2
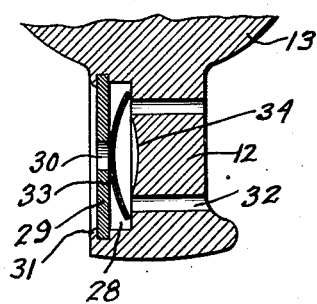
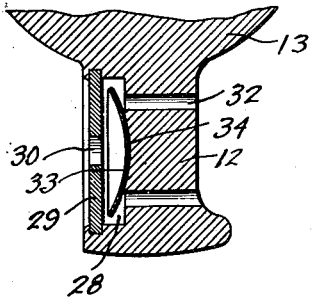
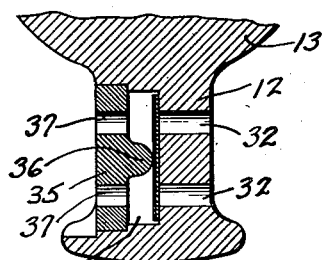
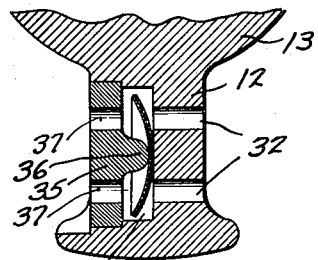
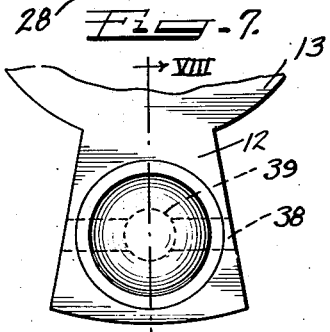
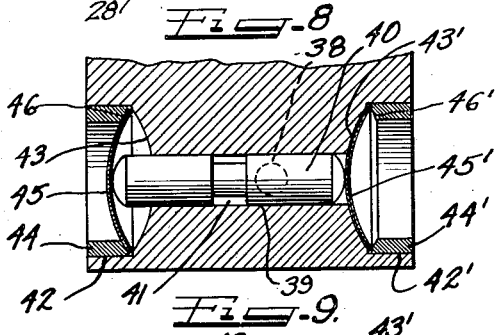
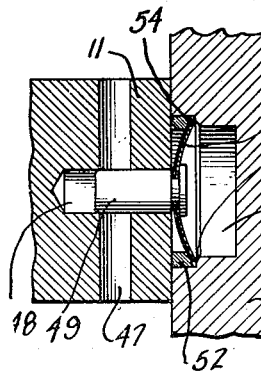
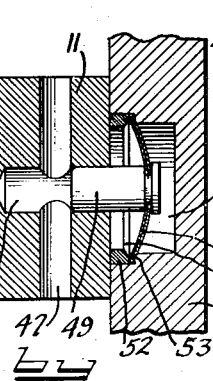
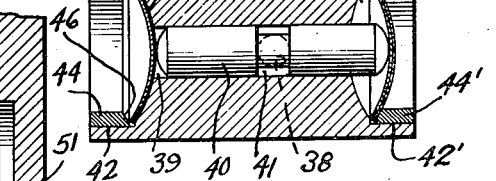
Inventor
Ralph F. Peo.

Patented Nov. 10, 1942

2,301,318

UNITED STATES PATENT OFFICE 2,301,318

THERMOSTATIC BY-PASS VALVE

Ralph F. Peo, Buffalo, N. Y., assignor, by mesne assignments, to Houdaille-Hershey Corporation, Detroit, Mich., a corporation of Michigan Application September 5, 1941, Serial No. 409,664

6 Claims. (Cl. 188—89)

My invention relates to hydraulic shock absorbers and particularly to the control of the hydraulic fluid flow under certain abnormal temperature conditions.

In hydraulic shock absorbers valving mechanism is provided for controlling the resistance to the hydraulic flow for the desired shock-absorbing action, and such regular valving means will usually properly function through a wide range of temperatures for efficient control of the shock-absorbing action. However, when the shock absorber is subjected to abnormally low temperatures, the viscosity of the hydraulic fluid will rapidly increase so that the fluid will not readily flow through the resistance passageway afforded by the regular valving means and the shock absorber is apt to slow down and not function efficiently. The purpose of my invention is to take care of this situation and I preferably accomplish it by providing a by-passageway controlled by a valve in the form of a snap action thermostatic disk, which valve will normally keep the by-pass closed for control of the shock absorber by the regular valving means but which, when the viscosity of the hydraulic fluid suddenly increases due to abnormally low temperatures, will be thermostatically snapped from its by-pass closing position to opening position so that the by-passageway will afford additional flow to relieve the flow passageways controlled by the regular valving mechanism so that the shock absorber may function efficiently until the temperature again comes within the normal range of operation when the thermostat valve will quickly close the by-passageway.

On the drawings are shown various arrangements of by-passageways and control thereof by the thermostatic disk valve. On these drawings:

Figure 1 is a plan view of a hydraulic shock absorber in section on plane I—I of Figure 2;

Figure 2 is a section on plane II—II of Figure 1;

Figure 3 is an enlarged cross section of one of the shock absorber piston vanes to more clearly show the by-passage arrangement shown in Figure 1, the thermostatic valve being shown in by-pass closing position;

Figure 4 is a section like Figure 3 but showing the thermostatic valve in by-passageway opening position;

Figure 5 is a section similar to Figure 3 showing a modified form of thermostat by-passage control with the thermostat valve in closing position;

Figure 6 is a section like Figure 5 showing the valve in opening position;

Figure 7 is a side view of a piston vane showing a modified arrangement of thermostat by-passageway control;

Figure 8 is a section on plane VIII—VIII of Figure 7; and showing the valve in closed position;

Figure 9 is a section like Figure 8 showing the valve in by-passage opening position;

Figure 10 is a sectional view of one of the shock absorber walls adjacent to one of the hydraulic chamber partitions or abutments and with thermostatic valve controlled means closing a by-passageway through the partition; and Figure 11 is a section like Figure 10 showing the valve in open position.

Figures 1 and 2 show a conventional type of hydraulic rotary shock absorber comprising the cup-shaped housing 10 in which extend the radial abutments 11 for cooperating with the vanes 12 on the piston hub 13 for defining opposed hydraulic working chambers 14 and 15. A wall 16 threads into the open end of the housing 10 and with this housing forms the cylindrical working space in which are the abutments 11 and in which the vanes 12 function. The wall 16 has the bearing flange for the piston shaft 18 which, at its outer end, is adapted for connection by a lever 19 usually with the axle structure of an automotive vehicle, while the housing or body 10 is secured to the vehicle chassis as by means of its ears 20.

Extending through the bore 21 of the piston shaft and hub is a valve stem 22 which has threaded engagement with the bore as indicated at 23, the valve cooperating with a seat 24. Passageways 25 through the piston hub inwardly of the valve seat connect the bore with the working chambers 14, while similar passageways 26, outwardly of the valve seat, connect the bore with the working chambers 15. The outer end of the valve stem has a lever 27 thereon whereby the stem may be readily turned for adjustment of the valve relative to its seat for the desired restricted fluid flow between the chambers 14 and 15 by way of the passages 25 and 26, in a manner well understood in the hydraulic shock absorber art. The valving mechanism thus far described, or any other desired valving mechanism, is usually provided in a shock absorber for controlling the flow resistance for the desired shock absorber action.

The regular valving mechanism in a hydraulic shock absorber usually provides sufficient fluid passageway through a wide range of temperature variations. However, it has been found that when the fluid is subjected to abnormally low temperature its viscosity quickly increases so that the regular valving mechanism will momentarily not afford adequate passageway for flow of the fluid while under high viscosity and that therefore the shock absorber may not operate efficiently during such abnormal temperature periods. Such periods of abnormal low temperature must be quickly met and taken care of and I therefore provide by-passageway for the fluid under control of a quick-acting valve, preferably a valve which is automatically quickly affected thermostatically for control of the by-passage. I therefore employ for the valve a bi-metal snap disk whose general construction is well known, it being normally cupped in one direction, and its cupping is reversed when a predetermined temperature is reached. In other words, the action of the disk is such that under high temperature it will be concavo-convex in one direction while, when the temperature is reduced to a certain point, the disk quickly snaps to concavo-convexity in the opposite direction.

Figures 1 and 2 show the thermostat controlled by-passageway in one of the piston vanes, Figures 3 and 4 showing the arrangement to enlarged scale. The vane on one side is recessed to form a cylindrical valve chamber 28 for which a plate 29 forms the outer wall, the plate having the axial passageway or orifice 30 and the plate being secured in position as by peening as indicated at 31. One or more passageways 32 through the vane communicate with the valve chamber. The bi-metal disk 33 is within the valve chamber and, during the ordinary range of temperature to which the shock absorber is subjected, the valve disk will be held convex toward the left and with its concave side spanning the passageways 32 to shut off the flow through these passageways. However, when the temperature drops to a degree outside of the normal temperature range, the thermostatic disk will be suddenly snapped to the condition shown on Figure 4 in which its convex side will be to the right for exposure of the passageway 32 for fluid flow, a concave recess 34 being preferably provided in the vane in which the convex side of the disk seats. In the arrangement shown in Figures 1 to 4, the disk substantially floats in the valve chamber 28 and, when the valve disk is in the condition shown in Figure 4, by-pass fluid can flow in only one direction past the valve, this being preferably the flow direction during rebound operation of the shock absorber when the fluid displacing pressure is high and more sudden. During the rebound operation of the shock absorber the piston will be moving in a clockwise direction and the by-pass flow will be through the port or orifice 30 in the plate 29 and into the valve chamber 28 and then around the edges of the valve disk through the passageways 32. On the bound stroke during which fluid displacement is usually slower, the by-pass flow may not be so necessary, and, referring to Figure 4, the by-pass flow entering the passageway 32 from the right may exert sufficient pressure againts the valve disk to seat it with its concave side against the plate 29 so that it will close the plate passageway 30. When the valve is in the position shown in Figure 3, the pressure on rebound stroke will hold the valve disk seated against the vane to span and close the passageways 32, and under bound pressure, the disk will be held against the plate 29 to close the passageway 30, so that there can be no by-pass flow during operation of the shock absorber during its ordinary temperature range.

Where by-pass flow is desirable during both bound and rebound operation of the shock absorber during abnormal low temperature, an arrangement such as shown in Figures 5 and 6 may be employed. In this arrangement the valve chamber closure plate 35 is provided with a projection or boss 36 which engages the valve disk to hold it in flat position against the vane to close the passageways 32 while the shock absorber is functioning through the normal range of temperature, the plate or wall 35 being provided with one or more passageways 37. When the valve disk is thus held flat, there can be no flow in either direction through the by-passageway, but as soon as the temperature drops to a point outside of the normal range, the valve disk will thermostatically quickly respond and will be snapped to the condition shown in Figure 6 with its convex face away from the vane to expose the passageways 32. The boss 36 will retain its hold on the disk so that it cannot cover the passageways 37 in the wall 35, the by-passageway being thus opened for by-passage flow during either the bound or rebound operation of the shock absorber. As soon as the temperature comes back into the normal range, the disk will snap back to its flat position shown on Figure 5 for closure of the by-passageway.

In the modified arrangement shown on Figures 7 to 9, a by-pass controlling plunger or piston valve is controlled and operated by two thermostatic disks. The by-passageway 38 is shown as extending through one of the piston vanes for by-passage flow between adjacent working chambers of the shock absorber. A bore 39 for a piston or plunger valve 40 extends through the vane at right angles to and intersecting the by-passageway 38, the valve having the port 41 intermediate its ends for registration with the by-passageway for flow therethrough under abnormal temperature conditions. In the opposite faces of the vanes are cylindrical recesses 42 and 42' respectively which are concentric with the bore 39, the inner sides of the recesses being concave as indicated at 43 and 43' respectively. Annular bushings 44 and 44' in the respective recesses function as seats for the thermostatic disks 45 and 45' respectively. The recesses 42 and 42' are closed at their outer ends by the end walls of the shock absorber cylinder space in which the piston vanes operate.

With the arrangement as shown on Figures 7, 8 and 9, the disks 45 and 45' are held during normal temperature range of operation of the shock absorber with their convex sides to the left, the disk 45 seating around its periphery against the beveled seat 46 of the bushing 44 while the disk 45' seats in the recess 43' in the vane, the disks then holding the valve plunger 40 toward the left in the bore 39 with its port 41 displaced from the by-passageway 38 so that this by-passageway is closed. When the temperature drops abnormally, the disks will quickly respond and be snapped to present their convex sides toward the right as shown on Figure 9, the disk 45 then seating in the recess 43 in the vane and the disk 45' seating against the beveled end 46' of the bushing 44'. This snap movement of the disks shifts the valve 40 toward the right to bring its port 41 into register with the by-passageway 38 for flow of fluid through the by-passageway until the abnormal temperature conditions are relieved, when the disks snap back to the position shown in Figure 8 for closure of the by-passageway by the valve. It is evident that instead of having the by-passageway and valve in a piston vane, a by-passageway and valve could be located in one of the abutments 11 of the shock absorber.

In the modified arrangement of Figures 10 and 11, the by-passageway 47 is shown through one of the abutments 11 for by-passageway between adjacent working chambers of the shock absorber. A bore or valve chamber 48 extends into the abutment from the outer face thereof to intersect the by-passageway 47 and to receive a valve 49 which will be controlled by a thermostat disk 50 located in the end wall 16 of the shock absorber. This wall has the cylindrical recess 51 enlarged at its outer end to receive an annular bushing 52 and to provide a seating shoulder 53 opposite the tapered seat 54 on the inner end of the bushing 52 so that the disk in its response to temperature change may fulcrum at its periphery for engagement with either the shoulder 53 or the seat 54. The disk is secured to the outer end of the valve 49 in any suitable manner so that the valve will follow the disk movements to open or close the by-passageway 47. Figure 10 shows the disk with its convex side toward the left and seating against the seat 54 on the bushing 52 and with the valve 49 extended across to close the by-passageway 47, for operation of the shock absorber during the normal range of temperature. When the temperature becomes abnormally low, the disk will respond and will assume the position shown on Figure 11 in seating engagement with the shoulder 53, in which position the valve is held open for flow through the by-passageway 47 until the temperature again comes within the normal range, when the disk will return the valve to its closed position.

I have shown practical and efficient embodiments of my invention, but I do not desire to be limited to the exact structure and arrangement shown and described as changes may be made without departing from the scope of the invention. For example, thermostatic disk controlled by-passages could be provided in both piston vanes or in both abutments, or at other suitable points in the shock absorber for assisting the regular valve mechanism to control the displaced fluid flow under abnormal low temperature conditions.

I claim as follows:

1. In a hydraulic shock absorber having valve mechanism for controlling the displaced fluid flow during operation of the shock absorber through a normal range of temperature, means providing a by-passageway for displaced fluid flow, and a thermostatic snap action disk arranged to close said by-passageway during operation of the shock absorber through normal temperature range but to quickly open said passageway when exposed to abnormal low temperature outside of the normal temperature range.

2. In a hydraulic shock absorber having a flow-resisting passageway for controlling the flow of the displaced hydraulic fluid during operation of the shock absorber, an auxiliary passageway for the displaced hydraulic flow, and a valve in the form of a thermostatic snap action disk arranged to close said auxiliary passageway under normal temperature conditions but to quickly open said passageway for auxiliary flow when the temperature drops abnormally.

3. In a hydraulic shock absorber a main passageway and an auxiliary passageway for the flow of displaced hydraulic fluid, and means for automatically controlling the auxiliary passageway in response to temperature change including a bi-metal snap disk for effecting opening of the passageway when snapped to cup shape in one direction and for effecting closure of the passageway when snapped to cup shape in the opposite direction.

4. In a hydraulic shock absorber having a flow resisting passageway for controlling the flow of the displaced hydraulic fluid during operation of the shock absorber through a normal range of temperature, means providing a by-passageway for displaced fluid flow including a valve chamber, and a valve in said valve chamber in the form of an imperforate thermostatic snap action disk responsive to variation of temperature of the hydraulic fluid to open or close said by-passageway.

5. In a hydraulic shock absorber, means providing a relief passageway for displaced hydraulic fluid including a valve chamber and ports extending therefrom, and a valve in said valve chamber in the form of an imperforate thermostatic snap action disk free to move bodily in said valve chamber and to flex in response to variation of temperature to quickly span said ports to close said passageway or to expose said ports for flow through the passageway.

6. In a hydraulic shock absorber, means providing a relief passageway for displaced hydraulic fluid including a valve chamber and ports communicating therewith, and a valve in said valve chamber in the form of an imperforate thermostatic snap action disk free to respond to temperature change to expose said ports for flow through said passageway or to cover said ports to close said ports against flow through said passageway.

RALPH F. PEO.